United States Patent [19]

Pelletier et al.

[11] Patent Number: 5,275,511
[45] Date of Patent: Jan. 4, 1994

[54] METHOD FOR INSTALLATION OF PILES IN OFFSHORE LOCATIONS

[75] Inventors: John H. Pelletier; Kris A. Digre, both of Houston; Earl H. Doyle, Jr.; Kenneth M. Cowan, both of Sugar Land; Arthur H. Hale; James J. W. Nahm, both of Houston, all of Tex.

[73] Assignee: Shell Oil Company, Houston, Tex.

[21] Appl. No.: 964,987

[22] Filed: Oct. 22, 1992

[51] Int. Cl.⁵ .................... E02D 5/00; E21B 33/14; E21B 33/13
[52] U.S. Cl. .................... 405/227; 106/707; 166/293; 405/232; 405/264; 405/166
[58] Field of Search .............. 405/227, 225, 224, 263, 405/264, 266, 232; 166/293, 295; 106/811, 719, 711, 705, 706

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,878,687 | 4/1975 | Tragesser .................. 405/227 |
| 3,887,009 | 6/1975 | Miller et al. . |
| 3,962,878 | 6/1976 | Hansen . |
| 3,964,921 | 6/1976 | Persinski et al. . |
| 3,987,636 | 10/1976 | Hruska et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |

(List continued on next page.)

FOREIGN PATENT DOCUMENTS 61-48454 3/1986 Japan .
833704 6/1981 U.S.S.R. .

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.
"Mud Disposal: An Industry Perspective", Hanson et al, Drilling, May 1986, pp. 16–21.
"Waste Minimization Program Can Reduce Drilling Costs", Hall et al, Oryx Energy Co., Houston, Tex., Oil & Gas Journal, Jul. 1, 1991, pp. 43–46.
"Phosphoric Acids and Phosphates", Kirk-Othmer Enc. of Chemical Technology, 3rd Ed., vol. 17, p. 477.
"Conversion of Drilling Fluids to Cements with Blast Furnace Slag-Performance Properties and Applications for Well Cementing", SPE Paper 24575 (Oct. 4, 1992) by Cowan et al.
"Quantitative Interpretation of X-Ray Diffraction Patterns of Mixtures.I.Matrix–Flushing Method for Quantitative Multicomponent Analysis" by Frank H. Chung, J. Appl. Crystal. (1974) 7, pp. 519–525.

Primary Examiner—Dennis L. Taylor

[57] ABSTRACT

A method for installing piles in offshore waters using a drill and grout technique. The method utilizes a drilling fluid for drilling the borehole for the pile that forms a cementitious filter cake on the borehole wall and a cement for grouting the pile that is compatible with both the filter cake and salt water.

6 Claims, 1 Drawing Sheet

U.S. PATENT DOCUMENTS

| | | |
|---|---|---|
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner ........................... 210/751 |
| 4,643,617 | 2/1987 | Kanno et al. .................... 405/222 |
| 4,664,843 | 5/1987 | Burba, III et al. . |
| 4,668,128 | 5/1987 | Hartley et al. . |
| 4,674,574 | 6/1987 | Savoly et al. ................... 166/293 |
| 4,690,589 | 9/1987 | Owa ................................ 405/263 |
| 4,692,065 | 9/1987 | Suzuki et al. ................... 405/211 |
| 4,720,214 | 1/1988 | Brasted et al. . |
| 4,746,245 | 5/1988 | Mork ............................... 405/224 |
| 4,760,882 | 8/1988 | Novak . |
| 4,761,183 | 8/1988 | Clarke . |
| 4,790,954 | 12/1988 | Burbe, III et al. . |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. ................... 166/293 |
| 5,026,215 | 6/1991 | Clarke . |
| 5,058,679 | 10/1991 | Hale et al. . |
| 5,082,499 | 1/1992 | Shen ................................ 106/735 |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. .............. 106/811 |
| 5,147,565 | 9/1992 | Bour et al. ..................... 252/8.551 |

METHOD FOR INSTALLATION OF PILES IN OFFSHORE LOCATIONS

BACKGROUND OF THE INVENTION

The present invention relates to a method for installing piles in offshore locations. More particularly, the invention relates to installing piles using what is commonly referred to as a 'drill and grout' method as contrasted to mechanically driving the pile into the ocean floor. In the drill and grout method, a borehole is drilled at the desired location and the pile is installed and cemented in place.

In the past, the reliability and load-carrying capacity of a drilled and grouted pile in an offshore location has been questioned. The concern arises from the inability to obtain reliable placement of the grouting cement around the pile and the inability to ensure that the grout obtained a good contact with both the surface of the pile and the surface of the borehole. It is obvious that if good contact is not achieved between the surface of the pile and the surface of the borehole, the load-carrying capacity of the pile is seriously reduced. The reliability of the contact of the grouting cement with the wall of the borehole is seriously affected by the mudcake that is deposited on the borehole wall from the drilling fluid used in drilling the borehole. While various methods have been proposed in the prior art for dealing with this problem, none are entirely reliable. Examples of such prior art are U.S. Pat. Nos. 2,649,160, 3,499,491 and 3,557,876. All of these patents describe methods for cementing casing in oil wells and describe various means for improving the contact between the cement and the wall of the borehole. In addition, the patents describe various ways for removing or neutralizing the effect of the mudcake deposited on the borehole wall from the drilling fluid used in drilling the borehole.

In all of the above systems Portland cement was used as the grouting material. The high viscosity and weight of Portland cement creates several problems when using it to grout piles in offshore locations. One problem caused by the high viscosity of Portland cement is the difficulty involved in attempting to place the cement in the annulus between the pile and the borehole wall. Normally, the pile will not be centered in the borehole and Portland cement will tend to flow towards the side of the pile that is the greatest distance from the borehole wall and force the opposite side of the pile into contact with the wall. This reduces the grouting on this side of the pile and the load-carrying capacity of the pile is reduced.

A low viscosity cement useful as a grouting composition for well casing is disclosed in U.S. Pat. No. 4,761,183. The cement is described as a mixture of blast furnace slag and water in which the ratio of water to blast furnace slag is between 3:1 and 12:1. The high water content is used to produce a low viscosity, flowable grouting material. In contrast, as the water content of a Portland cement slurry is increased the strength of the grout is reduced.

If the load-carrying ability of a drilled and grouted pile could accurately be predicted it would allow the use of conventional drilling rigs for installing piles in offshore locations. This would eliminate the expense of transporting special pile driving equipment to the location to install the piles. For example, if it is desired to use a conventional drilling rig to install piles using mechanical pile driving means, it is normally necessary to remove considerable equipment such as blowout preventors and drilling risers from the rig so that the pile driving equipment can be installed on the rig. As the exploration in offshore waters moves into deeper water and more exposed locations, this requires that the rig be moved to protected waters to effect the removal of the drilling equipment and the installation of the pile driving equipment. Any move may require removal of the drilling riser from the rig and this normally requires barges for storing the drilling riser. All of the above greatly increases the expense of installing piles in offshore locations whether special equipment is used or the drilling rig is used.

SUMMARY OF THE INVENTION

The present invention solves the above problems and provides a method for installing a pile using the drill and grout method to produce a pile having a predicted load-carrying capacity. The invention utilizes a novel combination of drilling fluids and cementitious slurries disclosed in the prior art. In particular, the method uses either seawater as a drilling fluid or the specialized drilling fluid that is disclosed in copending application Ser. No. 886,533 entitled "Universal Fluids for Drilling and Cementing Wells", filed May 20, 1992, and assigned to the same Assignee as the present invention. After the borehole is drilled utilizing either of the drilling fluids, the pile is cemented in place by adding blast furnace slag to the drilling fluid utilizing the technique for solidifying water-based muds described in U.S. Pat. No. 5,058,679, issued Oct. 22, 1991. The use of a grout comprising blast furnace slag and seawater as the water phase provides a pile in which the cement grouting has excellent contact with both the pile and the wall of the borehole. The resulting load-carrying capacity of the pile can be accurately predicted from the physical dimensions of the pile and the depth of the borehole.

Since the drill and grout method can be used for installing the piles, conventional drilling rigs, for example the semisubmersible rigs presently being used in the deep offshore waters, can be used for installing the piles. The drill and grout method will not require removal of any equipment from the rig and the conventional drill string can be used to both drill the borehole and grout the pile in the borehole. The drilling riser can be used or it can be lifted off the bottom and suspended below the rig. This ability greatly reduces the overall cost of installing piles since no special pile driving equipment is required nor is it necessary to transport other equipment to the offshore location.

BRIEF DESCRIPTION OF THE DRAWINGS

The present invention will be more easily understood from the following detailed description when taken in conjunction with the attached drawings in which.

DESCRIPTION OF THE PREFERRED EMBODIMENT

The present invention is directed to the installation of piles in offshore locations using the drill and grout method. The term 'offshore location' refers to locations in the various salt water bodies of the world in contrast with fresh water lakes and rivers. The salt water present in offshore locations is one of the causes of the lack of good contact of Portland cement and the pile surface and the surface of the wall of the borehole. The prior art practice is to pump the Portland cement slurry down the drill string, allow it to flow out the bottom and displace the drilling fluid from the annular space between the pile and the borehole wall. Since Portland cement tends to degrade in the presence of salt water, it is difficult to ensure that a good cement grout around the pile is obtained. The success of the grouting depends on the ability of the Portland cement grout to displace the seawater and drilling fluid from the annular space surrounding the pile. In addition, Portland cement is also incompatible with the mudcake that is deposited along the borehole wall as a result of the drilling fluid used in drilling the borehole.

In addition to the above problem, Portland cement is a relatively viscous material and thus, the placement of the cement in the annular space surrounding the pile is extremely difficult. It is especially difficult when the pile is positioned off-center in the borehole producing a very small space on one side of the pile and a wide space on the other. The Portland cement will tend to migrate toward the space having the greater annular width and away from the other side of the pile. This also contributes to the lack of good contact between the grouting cement, the surface of the pile, and the surface of the borehole wall. In addition, the heavy weight of Portland cement also influences its placement in the annular space around the pile and further aggravates the problems that occur when the pile is positioned off-center in the borehole. While attempts are made to center the pile in the borehole, obviously the borehole is not a straight, uniform, cylindrical hole. Any drilled hole will tend to have slight changes of direction, or dog legs, and other irregularities. Thus, even if the pile is centered in the borehole, there will be positions where it is off-center and closer to one side of the borehole than to the other.

Figure 1:
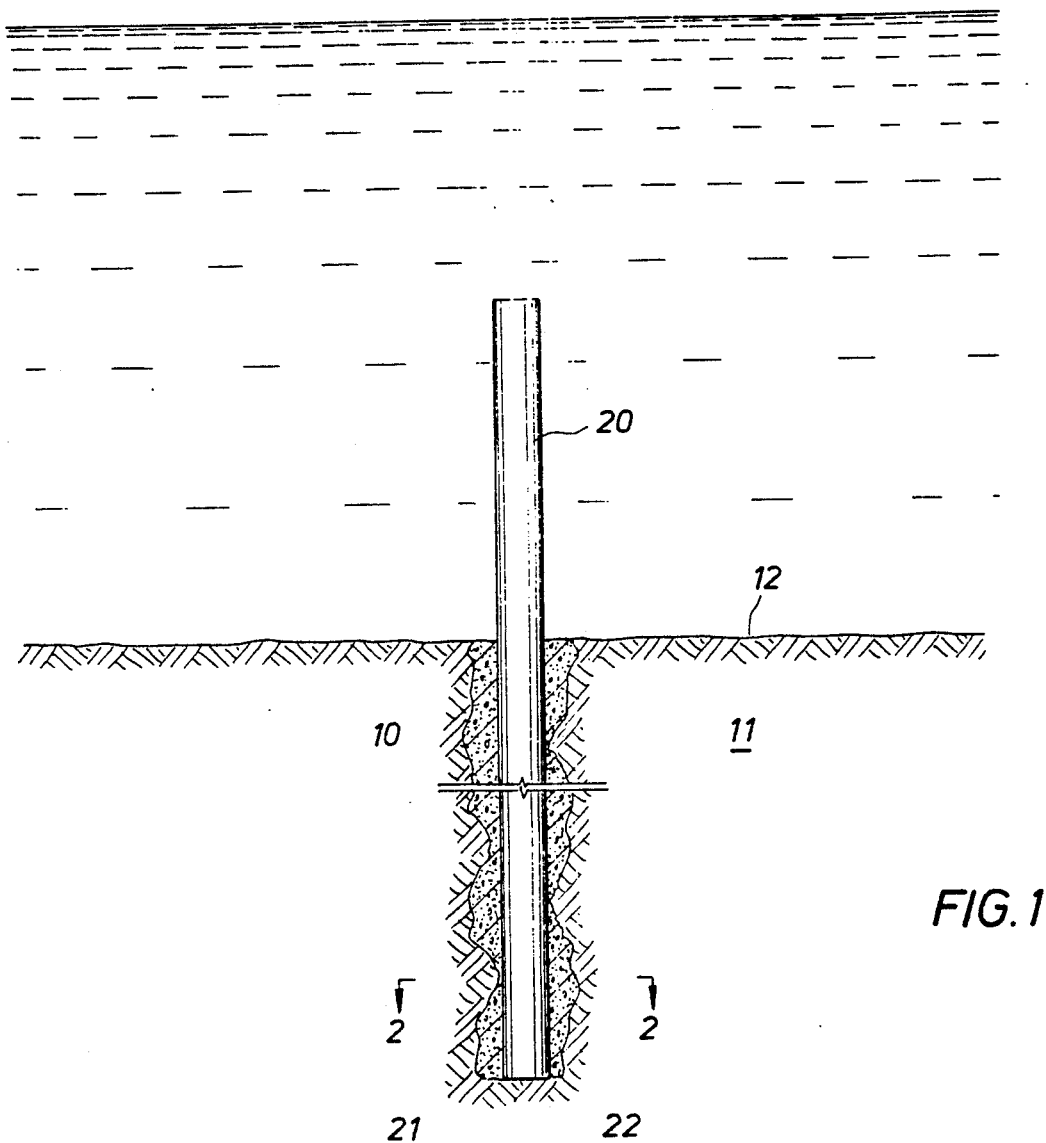
FIG. 1 is an elevation view shown in section of a pile which is grouted into a borehole drilled on the ocean floor.

Referring now to FIG. 1 there is shown a borehole 10 that is drilled in the formation 11 lying below floor 12 at the offshore location. The borehole 10 is drilled utilizing either the universal drilling fluid described in the above copending application or seawater. The choice of drilling fluid will depend on the depth of the borehole and the formations that are penetrated by the borehole. For shallow holes, i.e., approximately 500 feet or less, and the absence of any water-bearing formations, seawater would be satisfactory. For deeper holes or when water-bearing formations must be isolated, the more conventional drilling fluid is used to cause a mudcake to be deposited on the borehole wall in order to seal off the water-producing formations.

The drilling fluid, as described in the copending application (incorporated herein by reference), is a water-based drilling fluid that includes blast furnace slag as one of its constituents. In addition, other materials can be incorporated into the drilling fluid so that as it deposits as a mudcake along the wall of the borehole that is easily converted to a cementitious type material. As described in the copending application, the drilling fluid is compatible with salt water that exists in the offshore locations and salt water can be used as the aqueous phase in the drilling fluid. Thus, the drilling fluid is compatible with seawater at offshore locations and the mudcake can be converted to a cementitious material. This combination ensures intimate contact between the grouting cement and the wall of the borehole.

As explained above, for shallow holes (i.e., approximately 500 feet and in the absence of water-bearing sand), seawater may be used as the drilling fluid. In normal formations shallow holes will remain open and allow installation of the pile as described below In those cases where incompetent formations or water-bearing formations are penetrated, it will be necessary to use a conventional drilling fluid. It is preferred to use the drilling fluid of the copending application because it is compatible with both seawater and the cementitious slurry used for grouting the pile.

Figure 2:
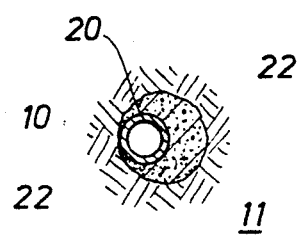
FIG. 2 is a cross section taken along line 2—2 of FIG. 1.

After the borehole is drilled to the desired depth, the pile 20 is installed in the borehole and centered as accurately as possible therein. While attempts are made to center the pile in the borehole, it will be off-center at various locations in the borehole. For example, as shown in FIG. 1, if the borehole is inclined slightly or if a pile is slightly misaligned, the bottom of the pile will be closer on the side 21 than it is on the side 22. Thus, the annular space will be wider at 22 than it is at 21 and will present difficulties in placing the cement. This difference in the width of the annular space is clearly indicated in FIG. 2 of the drawings.

After the pile is positioned and aligned, the drilling fluid is converted to a cement following the procedures described in U.S. Pat. No. 5,058,679 (incorporated herein by reference). This patent clearly describes how blast furnace slag can be added to the universal drilling fluid described in the copending application to convert the fluid to a cement-type material. The patent also describes how various materials may be added to the mixture of blast furnace slag and universal drilling fluid to control the viscosity and pumpability thereof. In some cases, it may be desirable to dilute the drilling fluid with seawater to reduce its density before adding blast furnace slag to the fluid. This will provide a cementitious slurry that has the same or slightly higher density as the original drilling fluid. The density of the cementitious slurry should be controlled so that the possibility of hydraulically fracturing the formations penetrated by the borehole is reduced. After the blast furnace slag is mixed with the drilling fluid, it is pumped down the interior of the pile 20 using well known methods. The mixture is displaced from the bottom of the pile and forced up through the annular space between the pile and the wall of the borehole. As a result of the lower viscosity and lighter weight of the blast furnace slag/borehole fluid mixture, it will be easily displaced along the complete depth of the borehole 10. This displacement will be uniform regardless of the width of the annular space and ensure complete cementing of the pile in the borehole.

The blast furnace slag/drilling fluid mixture described in the '679 patent is fully compatible with both the seawater existing in the offshore location and the cementitious sheath formed by the mudcake along the borehole wall. The mixture, upon solidifying, will form an excellent bond with both the wall of the borehole and the surface of the pile. Since the bond is complete and readily predictable the load-carrying ability of the pile will be predictable.

An alternate procedure to that described above would be to fill the borehole with the cementitious slurry and then lower the pile into the borehole. The pile can be reciprocated to distribute the cementitious slurry and provide complete contact between the cementitious slurry and both the pile and the wall of the borehole. This procedure can be used because of the unique properties of the cementitious slurry that utilizes blast furnace slag as the cementitious material. Both the density and viscosity of the slurry can be controlled to obtain any desired characteristics without reducing the strength of the cement. This allows the pile to be inserted in the borehole and easily reciprocated to provide substantially 100 percent contact between the cement, the pile and the wall of the borehole. In contrast, Portland cement-based slurries are viscous and heavy. If water is added to reduce the viscosity and density, the strength of the cement is reduced.

In those instances where seawater is used as a drilling fluid, a particularly useful slurry can be formed of 200 to 500 pounds of blast furnace slag when mixed with a barrel of salt water. The term salt water is used to describe both brine water and sea water.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 0–2. A typical specific example is: $SiO_2$, 36.4; $Al_2O_3$, 16.0; CaO, 43.3; MgO, 3.5; iron oxides, 0.3; S, 0.5; and $MnO_2O_3 < 0.1$.

Blast furnace slag having relatively small particle size is frequently desirable because of the greater strength it imparts in many instances to a final cement. Characterized in terms of particle size the term "fine" can be used to describe particles in the range of 4,000 to 7,000 $cm^2/g$ Blaine specific surface area. Corresponding to 16 to 31 microns in size; "microfine" can be used to describe those particles in the 7,000 to 10,000 $cm^2/g$ Blaine specific surface area range that correspond to particles of 5.5–16 microns in size and "ultrafine" can be used to describe particles over 10,000 $cm^2/g$ Blaine specific surface area that correspond to particles 5.5 microns and smaller in size. Small particle size blast furnace slag is available from Geochem under the trade name "MICROFINE MC 100", the Blue Circle Cement Company, and Koch Industries, Tulsa, Okla., under the trade name "WELL-CEM". The Koch material has a Blaine specific surface area of about 10,040 $cm^2/g$.

However, it is very time consuming to grind blast furnace slag to these particles sizes. It is not possible to grind blast furnace slag in a manner where particles are entirely once size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 8 wt % can be ground to the ultrafine particle size and the remainder ground in a normal way thus giving particles generally in a size range of greater than 11 microns, the majority being in the 11 to 31 micron range.

These blast furnace slags have the property of forming a materially stronger cement, for example, approximately double the strength of the resulting cement when the slags are mixed with fresh water. Thus, the present invention is extremely useful in cases where the brine water is present in the excavated trench. In addition to the slag, it is desirable to add from 2 to 10 pounds sodium hydroxide, commonly referred to as caustic soda and 5 to 15 pounds of sodium carbonate, commonly referred to as soda ash to control the hardening time of the slurry as well as its rheological properties.

Slurries prepared from the above-described slag using sea water exhibit shear strength in the range of 35 to 50 psi when aged at 50° F. for approximately ten days. In contrast, Portland cement the range of 20 psi. When the slurry utilizes a drilling fluid such as those described in the copending application, the shear strength is reduced. The degradation of Portland cement slurries in the presence of drilling fluids described in the copending application further reduces their shear strength.

In place of the above described cementitious slurry one could use a slurry formed of a metal oxide, which is a proton acceptor, and a water-soluble or water-dispersable polymer. The metal oxide can be calcium oxide, magnesium oxide, zinc oxide or manganese oxide, with the preferred oxide being magnesium oxide or zinc oxide. The polymer can be any carboxylic acid polymer, phosphonic acid polymer, or sulfonic acid polymer. The amount of polymer used is in the range of 10 to 100% by weight based on the weight of the metal oxide and preferably 10 to 80% by weight of the metal oxide.

The cementitious slurry is preferably prepared by first mixing the metal oxide with water, preferably brine water or seawater, in the ratio of 50 to 300 pounds per barrel of total fluid including the metal oxide. The polymer is then added to form the cementitious slurry. The slurry can then be placed in the borehole to grout the pile in place, using either of the above described methods.

An alternative to the above slurry is a slurry formed by the substitution of a phosphorus acid for the polymer described above. The amount of phosphorus acid added should be a stoichiometric amount or less based on the metal compound. Suitable phosphorus acids are phosphonic acid, phosphoric acid and polyphosphoric acids and salts of phosphoric acid.

When a drilling fluid is converted to a cementitious slurry for grouting, its density can be controlled by first diluting the drilling fluid and then adding the cementitious material. The control of the density of the slurry will eliminate the problem of hydraulically fracturing the formations penetrated by the pile borehole. The above slurries have excellent strength and high water-to-solids ratios. In contrast, Portland cement slurries lose considerable strength at high water ratios.

All of the above described slurries utilize brine water or seawater as the water phase and thus are compatible with seawater. In addition, the slurries are compatible with the earth formations forming the sea bottom in offshore locations. These unique properties produce a superior grouting material for grouting a pile in an offshore location. The load capacity of the pile can be accurately predicted because the low viscosity of the slurries, when combined with their controlled densities, produces a hardened cement that has substantially zero voids. The shear strength of the hardened cement slurry can be determined from tests and used to calculate the load capacity of the pile.

What is claimed is:

1. A method for installing a pile in an offshore location using a drill and grout technique, said method comprising:

drilling a pile borehole using a water-based drilling fluid that is compatible with the seawater overlaying the offshore location;

installing the pile in the borehole;

mixing blast furnace slag with the drilling fluid to form a cement mixture that is compatible with the seawater and the mudcake deposited on the borehole wall from said drilling fluid;

pumping the cement mixture down the pile to displace the drilling fluid from the pile and the annulus surrounding the pile; and allowing the cement mixture to set, thereby cementing the pile in the borehole.

2. The method of claim 1 wherein the viscosity of the cement mixture is controlled by the addition of additives.

3. The method of claim 4 wherein the activator ia added to the cementitious slurry.

4. A method for installing a pile in an offshore location using a drill and grout technique, said method comprising:

drilling a pile borehole using a water-based drilling fluid;

installing a pile in the borehole; and grouting the pile in place by adding between 50 and 300 pounds of a proton acceptor metal oxide per barrel of drilling fluid and 10 to 100 wt % of an acid polymer based on the weight of the metal oxide to the drilling fluid, and displacing the drilling fluid from the annulus surrounding the pile with the drilling fluid containing said metal oxide and phosphorus acid.

5. The method of claim 4 wherein the metal oxide is selected from the group consisting of calcium oxide, magnesium oxide, zinc oxide and sulfonic acid polymer.

6. The method of claim 4 wherein the acid polymer is selected form the group consisting of carboxylic acid polymer, phosphonic acid polymer and sulfonic acid polymer.

* * * * *